United States Patent [19]

Hartung

[11] Patent Number: 4,661,134
[45] Date of Patent: Apr. 28, 1987

[54] METHOD AND APPARATUS FOR FIBERIZING MOLTEN MINERAL MATERIAL

[75] Inventor: Gunnar W. Hartung, Sköude, Sweden

[73] Assignee: Rockwool Aktiebolaget, Sweden

[21] Appl. No.: 751,064

[22] Filed: Jul. 2, 1985

[30] Foreign Application Priority Data

Jul. 3, 1984 [SE] Sweden .............................. 8403522

[51] Int. Cl.$^4$ ............................................ C03B 37/05
[52] U.S. Cl. ................................................ 65/6; 65/8;
 65/14; 65/15; 264/8; 425/8
[58] Field of Search .............................. 65/6, 8, 14, 15;
 425/6–8; 264/8

[56] References Cited

U.S. PATENT DOCUMENTS

| | | | |
|---|---|---|---|
| 2,632,920 | 3/1953 | Koehler | 65/8 X |
| 2,663,051 | 12/1953 | Graybeal | 65/8 |
| 3,246,971 | 4/1966 | Rudin | 65/15 |
| 4,353,724 | 10/1982 | Houston | 65/8 |
| 4,356,017 | 10/1982 | Ankersson | 65/8 |
| 4,541,854 | 9/1985 | Schonhaar et al. | 65/15 |

FOREIGN PATENT DOCUMENTS 57-1495  1/1982  Japan ....................................... 65/15

Primary Examiner—Robert Lindsay
Attorney, Agent, or Firm—Larson and Taylor

[57] ABSTRACT

A method and an apparatus in a plant for fibrating molten mineral material which in the form of a stream of molten material (4) is discharged to the peripheral surface of a primary spinner wheel (1) and which is formed to mineral fibres by being thrown out from the spinner wheel or from several cooperating spinner wheels. The distribution of the stream of molten material (4) over the width or length of the primary spinner wheel is improved in that a force is applied to the incoming stream of molten material (4), especially from rear side thereof as seen in the rotation direction of the spinner wheel, which force is acting in a plane substantially perpendicular to a generatrix to the peripheral surface of the spinner wheel (1) and in a blunt angle to the stream of molten material (4). The force acts on a stream of molten material a short distance in advance of the place where the material comes into contact with the spinner wheel (1), and the force provides a widening of the stream of molten material without breaking same up into small fragments. The force may be provided by a gas flow (5) or by different mechanical deflector means.

18 Claims, 6 Drawing Figures

METHOD AND APPARATUS FOR FIBERIZING MOLTEN MINERAL MATERIAL

The present invention relates to a method and an apparatus for fibrating molten mineral material which, in the form of a stream of molten material, is discharged onto the surface of a spinner wheel of a fibrating apparatus and which form mineral fibres in that the molten material is thrown out from the spinner wheel or from several cooperating spinner wheels.

In a frequently used method for fibrating molten mineral material the molten material is allowed to continuously flow down onto a so called primary spinner wheel by which the molten material is partly fibrated by being thrown out therefrom and from which the molten material is also thrown away onto another similar spinner wheel. The spinner wheels are more or less cylindrical. They may for instance be circular cylindrical, conical or similarly formed steel wheels adapted to rotate at high speeds and to the peripheral surface of which the molten material is discharged.

When the process is running adequately the molten material wets the spinner wheel and adopts rotational energy therefrom. A part of the molten material thereby is quickly thrown off the spinner wheel and is possibly caught by another spinner wheel. The part of the molten material which attains the peripheral speed of the spinner wheel, or at least a great portion thereof, is little by little thrown off in the form of small drops. These thrown off drops are drawn out into fibers.

It has always been considered important to have a large portion of the molen material adhere to the spinner wheel, so that only a small portion of the molten material, or preferably no molten material at all, is thrown off in advance. This problem has been subjected to much work and several different solutions thereof have been suggested. Said solutions have been based on either of the two following main thoughts:

1. To give the discharged molten material a high impact energy;
2. To spread the molten material over a large part of the width of the spinner wheel.

In the U.S. Pat. No. 2,577,431 (Powell) both thoughts are mentioned. In the patent there is disclosed a spinner machine having two spinner wheels and in which the molten material is discharged onto the first spinner wheel and in which a part of the molten material from there is thrown onto the second spinner wheel. From FIG. 2 of the patent, it is evident that molten material is thrown back from the second spinner wheel onto the first spinner wheel. This is still more evident from FIG. 4 of the patent, and in this figure some further transferrings between the spinner wheels are also shown. The apparatus according to the patent is formed with a nozzle which blows gas onto the stream of molten material. Depending on the action of the nozzle the molten material is discharged onto the first spinner wheel in the form of a shower of molten drops of material.

The U.S. Pat. No. 2,398,707 (Hawthorne et al) shows how the molten material is spread out over the spinner wheels in that the spinner wheels are more or less clamped to each other. In any case the distance between the spinner wheels is so little that there may be such an action.

Only an increase of the impact force is supposed to be the idea behind the British patent GB No. 673.561 (Powell). In this case two rapidly rotating wheels are mounted in advance of the actual spinner wheel and said rapidly rotating wheels act as an acceleration means for the molten material. When the molten material has reached the first actual spinner wheel it has already attained a high speed.

The apparatus according to the Swedish laid out publication SE No. 365.188 (Battigelli) is still more sophisticated. FIG. 2 of the publication shows how the molten material is supplied from the side of a spinner wheel having a vertical axis. The idea is to throw the molten material onto the actual spinner wheel by means of a thrower disc. By giving the surface of the thrower disc a suitable form, any cross section shape of the stream of molten material at the impact point can be obtained, within certain limits. This is evident from the diagrammatical FIGS. 3–6 of the publication. FIGS. 11–19 show different ways of having the stream of molten material move by oscillating movements over the spinner wheel. FIGS. 20–21 illustrate a suggested method of smearing the molten material over the spinner wheel.

Of the above mentioned methods it seems that only the method according to the British patent GB No. 673.561 and equivalent types of apparatus has come into practical use. There are, however, two essential disadvantages involved in this method. Firstly the method causes a splitting up of the stream of molten material into small fragments, and therefore the molten material does not reach the first actual spinner wheel as a continuous stream; secondly it is not possible to prevent the spinner wheel-like wheels included in the acceleration means from also throwing out fibers. Since said wheels rotate at slower speed than the actual spinner wheels the fibers thrown out therefrom also become substantially more coarse than the other fibers and this is a further disadvantage. Further it is not wanted that the spinner wheels are supplied with a shower of drops since this is a disturbing moment in the fibrating process and leads to unnecessary losses of material.

It is very difficult to supervise the first mentioned method which is described in the U.S. Pat. No. 2,577,431 and it also gives much loss of material depending on the fact that the first spinner wheel is fed with an uncontrolled drop shower of molten material. It is easy to understand that, if the stream of molten material suddenly becomes smaller, the nozzle will blow the molten material over the edge of the spinner wheel. If, on the other hand, the stream of molten material suddenly becomes heavier the opposite situation will appear. Since melting equipment, which is normally used in connection with fibrating processes of this type give varying flows of molten material, the method described in the U.S. patent in question will not function in practice.

The idea of mounting the spinner wheels closely together as suggested in U.S. Pat. No. 2,398,707 is doomed to be a failure. Tests have shown that such an apparatus only provides a heavy spray of molten material directed straight downwards. Apart therefrom the apparatus is subject to be damaged by not-molten particles included in the stream of molten material. Unfortunately solid (non-molten) particles often are included in the stream of melted material when the material is molten in shaft furnaces. Often small pieces of coke leave the furnace together with the molten material and in such case the illustrated apparatus is subjected to heavy stresses.

The method according to the Swedish laid open publication SE No. 365.188 must be considered a "drawing table product". Any person experienced in this technical field must realize that a plate of the type illustrated in FIG. 2 of the patent can not emit a concentrated stream of material but more a fan-shaped stream of material. Therefore the stream of material is completely useless for the purpose. Also the other types of apparatus suggested according this laid open publication can not be seen to function in practice.

Considering the above proposals it may seem that the proposal according the Swedish patent SE No. 196.871 (Chen et al) is slightly different. According to said Swedish patent, the apparatus comprises a wheel operating as an acceleration and distribution wheel, which at the centre of its peripheral surface has an uppwardly projecting ridge or edge extending all around the wheel. It is intended that the molten material should hit the very centre of said ridge or edge and that the molten material should be divided into two streams, so that the impact surface at the spinner wheel becomes greater than it would otherwise have been. From FIG. 1 of this patent is also evident that the inventors have thought that the molten material which is thrown from the first spinner wheel onto the second spinner wheel should be divided a second time by the ridge of the distribution wheel. Tests have shown that the described apparatus does not operate especially well. It is very difficult to have the molten material to really hit the centre of the ridge, and the molten material also tends to move up along the ridge and to become thrown out from the top thereof in the form of a stream rather than being thrown out from the two parts of the peripheral surface in the form of two separate streams as was intended.

The present invention is intended to solve the problems and disadvantages in the previously known methods and apparatus, and more particularly the invention relates to a method and an apparatus adapted to give a distribution of the discharge molten material over the width of the primary spinner wheel. The invention is based on the discovery that it is of greatest importance, in order to obtain such a distribution or widening of the stream of molten material as mentioned above, that is the stream of molten material is not broken up so as to hit the primary spinner wheel in the form of a shower of melted drops.

According to the invention the distribution of the discharged stream of molten material over the width of the primary wheel is improved in that a force is applied to the incoming stream of molten material which force acts in a plane which is substantially perpendicular to a generatrix to the peripheral surface of the spinner wheel and which acts on the stream of molten material some distance in advance of the point where the stream of molten material comes in contact with the spinner wheel so that the stream of molten material is widened without being broken up into small fragments.

It has shown that this is possible by directing a flow of gas against the stream of molten material. Most preferably the force should be applied to the rear side of the stream of molten material as seen in the rotation direction of the spinner wheel.

Another, more easily controllable, way of widening the stream of molten material is to allow said stream to hit a deflector which deflects the moving direction thereof. In a suitable embodiment of the deflector the result is that the deflected stream of molten material is flattened. If now the deflector is placed sufficiently close to the spinner wheel, and this is a presumption for the invention, the stream of material will hit the spinner wheel in a continuous and widened form. The deflector may be stationary and can be a simple curved or double curved plate of a heat resistant material, or it may be a slowly rotating, more or less cylindrical deflector body. The deflector is rotated for successively releasing the deflector from slag and for always having a fresh surface facing the stream of molten material. The rotation speed need not be very high, and a rotation speed of between 20 and 400 r/m or preferably 100–200 r/m is quiet sufficient. If the deflector is rotated at higher speed there is a risk that the deflector starts forming fibres, and this is not wanted.

The widening method may be disturbed. This may happen depending on variations in the flow of molten material. Therefor such variations ought to be avoided. Another and more serious disturbance may appear if the stream of molten material is hit by particles thrown out from any of the spinner wheels before the stream of molten metal is widened. The risk is especially large that the stream of molten material is hit by particles from the primary spinner wheel. If such disturbances are very frequent they may be avoided by mounting a protection means between the spinner wheels and the deflector.

For particles thrown out from other spinner wheels than the primary spinner wheel the deflector itself, correctly designed, may form its own protection.

The stream of molten material ought to be deflected very close to the periferal surface of the spinner wheel. The distance should not exceed 50 mm or preferrably 30 mm.

The deflector should be designed so that a widening of the stream of molten material is at least 20% in order to give a substantial effect. The widening very well may be 50%. If the flow of molten material is increasing there is a stronger demand for widening of the stream of molten material.

Now the invention should be described more in detail with reference to the accompanying drawings. In the drawings FIG. 1A shows a vertical cross section through a diagramatically illustrated apparatus including a spinner wheel for fibrating molten material and having a means of the above mentioned type for widening the stream of molten material. FIG. 1B is a cross section along line A—A of FIG. 1A.

Figure 1A:
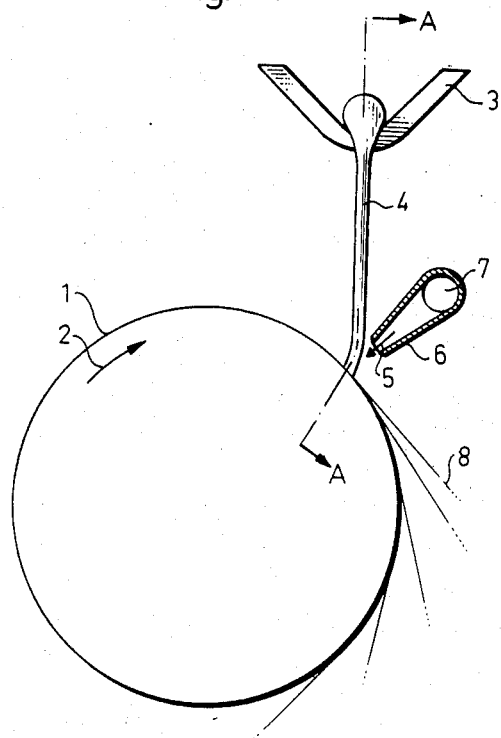
Figure 1B:
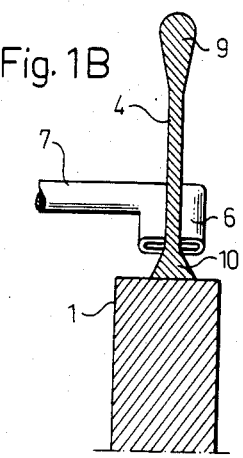

The apparatus illustrated in FIGS. 1A and 1B comprises a spinner wheel 1 rotating in the direction of the arrow 2 from a flute 3 for molten material a jet 4 of molten material flows down towards the spinner wheel 1. A short distance in advance of the point where the molten material hits the spinner wheel the said jet 4 is subjected to the action of a gas flow 5 coming from a nozzle 6. The nozzle is supplied with gas from a gas conduit 7. The jet 4 of molten material, which after having been widened depending on the action of the gas flow 5 hits the spinner wheel 1, is accelerated, and is thrown out from the spinner wheel in the form of small drops, which drops are drawn out to fibers 8 which are consequently thrown out from the spinner wheel.

FIG. 1B shows how the jet 4 of molten material is wide at the place 9 where the jet flows out of the flute 3. Soon thereafter the jet 4, however, takes a circular cross section form. The glas flow 5 from the nozzle 6 re-widens the jet of molten material so that the jet when hitting the spinner wheel is wider at the part 10 than in advance of the place of widening the stream of molten material.

Figure 2:
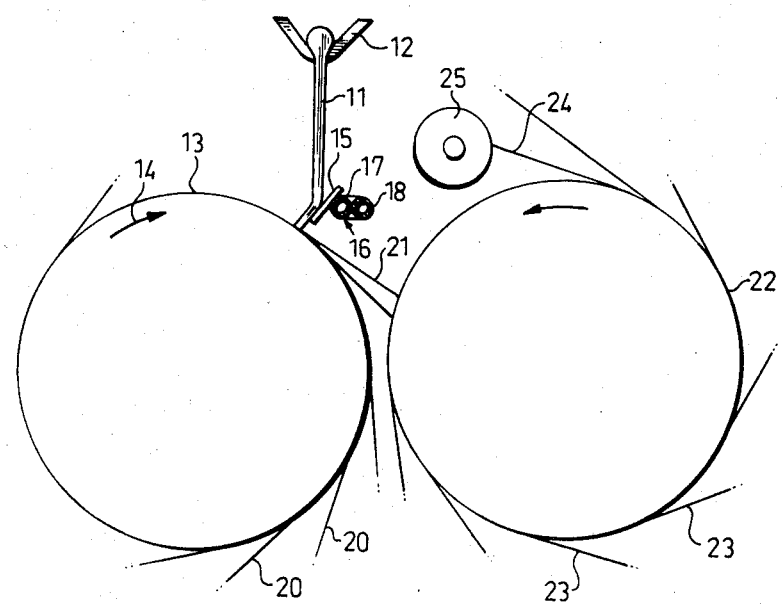
FIG. 2 illustrates an alternative embodiment of a widening apparatus similar to that of FIG. 1A mounted in an apparatus having two spinner wheels.

FIG. 2 shows an apparatus having two spinner wheels in which a jet or stream 11 of molten material coming from a flute 12 is allowed to flow to a primary spinner wheel 13 rotating in the direction of the arrow 14. In advance of the place where the stream of molten material hits the primary spinner wheel 13, a deflector 15 is mounted in the flow way path of the stream of molten material. The deflector 15 is mounted on a carrier comprising two tubes 17 and 18 which at one end are connected into a U-form. The tubes 17 and 18 are watercooled and the water enters through the tube 18 and is drained through the tube 17. The deflector is made of a material which is resistant under actual operating conditions. When the stream or jet 11 of molten material comes into contact with the deflector 11, it is widened so that said stream is substantially wider when reaching the spinner wheel 13 than the stream diameter in advance of the deflector plate. The molten material which reaches the spinner wheel 13 partly adheres to said spinner wheel and leaves the surface of the spinner wheel 13 in the form of molten drops 20 and later fibres. A part of the molten material is transferred as a continuous unit 21 to the second spinner wheel 22 which rotates in the opposite direction as the spinner wheel. From the spinner wheel 22 drops or fibres 23 formed by said drops are thrown out. Some of the drops, fibres or particles which leave the spinner wheel 22 may risk hitting the stream of molten material 11. Such particles have been symbolized with the line 24. A rotating cylinder 25 is mounted in the flow direction of the particles 24. The cylinder 25 is watercooled at the interior and rotates with low peripheral speed.

Figure 3:
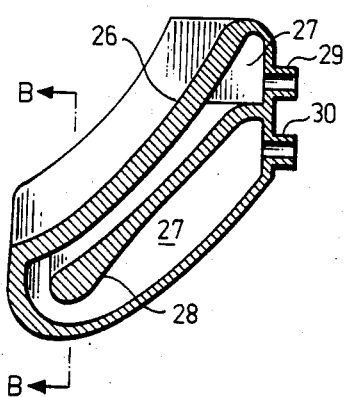
FIG. 3 is a cross section through a widening means according to the invention designed as a deflector.
Figure 4:
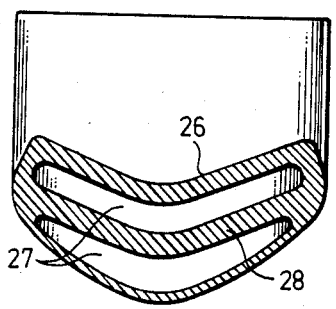
FIG. 4 is a cross section along line B—B of FIG. 3.

FIG. 3 shows a cross section through an embodiment of a deflector plate which is watercooled. The plate comprises an upper deflector wall 26 of relatively heavy material, a space 27 inside the plate and an intermediate wall 28 dividing the space into two compartments. Cooling water is fed into the space 27 over an inlet 29 and thereby flows into the compartment between the upper wall 26 and the intermediate wall 28 and down to the lower end of the deflector plate where the cooling water is turned and moves up underneath the intermediate wall 28 and leaves through an outlet 30.

Figure 5:
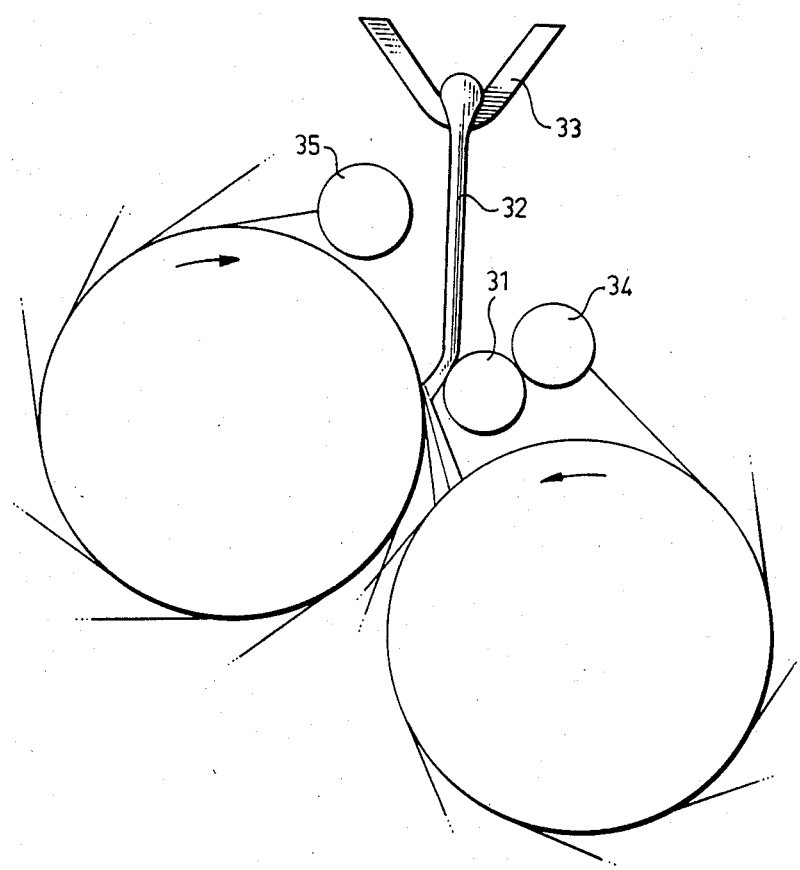
FIG. 5 shows a further alternative embodiment of a widening means for a fibrating apparatus having two spinner wheels.

FIG. 5 shows an apparatus in which a rotating cylinder 31 is used as a widening means or a deflector for the stream 32 of molten material coming from the flute 33. The widening means for the stream of molten material is shown combined with a protector 34 for the stream of molten material which is mounted above the second spinner wheel and which protects the stream of molten material against particles thrown out from the second spinner wheel. In the figure there is also shown the use of a second protector 35 for molten material placed over the primary spinner wheel for protecting the stream 32 of molten material against particles thrown out from the primary spinner wheel. The stream widener 31 and the stream protectors 34 and 35 preferably are cooled at the interior by a cooling system which is not illustrated in the figure.

It should be observed that the cylindrical rotating deflector 31 for the stream of molten material may have different size and shape depending on what specific effect is wanted, and it may for instance be circular cylindrical or formed as a circular truncated cone having the course end and the narrow end respectively directed in any direction depending on the specific effect which is wanted.

It is to be understood that the above specification and the embodiments of the invention shown in the drawings are only of illustrating character and that many different alternatives and modifications may be presented within the scope of the appended claims.

I claim:

1. In a method of fibrating molten mineral material which comprises discharging an incoming stream of molten mineral material to the peripheral surface of a primary spinner wheel and forming mineral fibers by throwing out molten mineral material from one or more spinner wheels, the improvement which comprises:

applying a force to said incoming stream of molten mineral material to increase the width of said incoming stream of molten mineral material over the peripheral surface of said primary spinner wheel, said force acting in a plane substantially perpendicular to a generatrix to the peripheral surface of said primary spinner wheel, said force acting on said incoming stream of molten material a short distance in advance of the place where said incoming stream of molten mineral material contacts said peripheral surface of said primary spinner wheel, whereby the width of said incoming stream of molten mineral material over the peripheral surface of said primary spinner wheel is increased without breaking up said incoming stream of molten mineral material into small fragments.

2. A method according to claim 1 wherein said force is applied to said incoming stream by directing a flow of gas against the incoming stream of molten material.

3. A method according to claim 2 wherein said flow of gas is directed onto said incoming stream by directing a flow of gas against the incoming stream of molten material from the rear side thereof as viewed in the direction of rotation of said primary spinner wheel.

4. A method according to claim 2 wherein said force is applied to said incoming stream by providing a deflector in the flow path of said incoming stream of molten mineral material.

5. A method according to claim 4 further comprising rotating said deflector.

6. A method according to claim 1 further comprising protecting said incoming stream of molten mineral material from particles thrown out from a spinner wheel.

7. A method according to claim 1 wherein said force is applied at a distance of not more than 50 mm from the peripheral surface of said primary spinner wheel.

8. A method according to claim 1 wherein said force is applied at a distance of not more than 30 mm from the peripheral surface of said primary spinner wheel.

9. A method according to claim 1 wherein the width of said incoming stream is increased at least 20%.

10. A method according to claim 1 wherein the width of said incoming stream is increased at least 50%.

11. In apparatus for fibrating molten mineral material which comprises means for discharging an incoming stream of molten mineral material to the peripheral surface of a primary spinner wheel and means for forming mineral fibers by throwing out molten mineral material from one or more rotating spinner wheels, the improvement which comprises means for applying a force to said incoming stream of molten mineral material to increase the width of said incoming stream of molten mineral material over the peripheral surface of said primary spinner wheel, said force acting in a plane substantially perpendicular to a generatrix to the peripheral surface of said primary spinner wheel, said force acting on said incoming stream of molten material a short distance in advance of the place where said incoming stream of molten mineral material contacts said peripheral surface of said primary spinner wheel, whereby the width of said incoming stream of molten mineral material over the peripheral surface of said primary spinner wheel is increased without breaking up said incoming stream of molten mineral material into small fragments.

12. Apparatus according to claim 11 wherein said force applying means comprises means for directing a flow of gas against the incoming stream of molten material.

13. Apparatus according to claim 11 wherein said force applying means comprises a deflector positioned in the flow path of said incoming stream of molten mineral material.

14. Apparatus according to claim 13 further comprising means for rotating said deflector.

15. Apparatus according to claim 13 wherein said deflector is oriented at a blunt angle with respect to said stream of molten material.

16. Apparatus according to claim 14 wherein said deflector comprises a substantially cylindrical member adapted to rotate about a substantially horizontal axis.

17. Apparatus according to claim 13 further comprising means for cooling said deflector.

18. Apparatus according to claim 11 further comprising means for protecting said incoming stream of molten mineral material from particles thrown out from a spinner wheel.

* * * * *